United States Patent [19]

Cohen

[11] 4,445,175

[45] Apr. 24, 1984

[54] SUPERVISORY REMOTE CONTROL SYSTEM EMPLOYING PSEUDORANDOM SEQUENCE

[75] Inventor: Yitzhak Cohen, Yahud, Israel

[73] Assignee: Motorola, Inc., Schaumburg, Ill.

[21] Appl. No.: 301,695

[22] Filed: Sep. 14, 1981

[51] Int. Cl.³ .............................................. G06F 13/00
[52] U.S. Cl. .................................................... 364/200
[58] Field of Search ................................. 364/200, 900

[56] References Cited

U.S. PATENT DOCUMENTS

| | | |
|---|---|---|
| 3,539,998 | 10/1970 | Belcher et al. |
| 3,668,273 | 8/1972 | Narang |
| 3,668,651 | 6/1972 | Hornung |
| 3,693,161 | 9/1972 | Price et al. ............ 364/200 |
| 3,767,901 | 10/1973 | Black et al. ............ 364/200 |
| 3,993,871 | 11/1976 | Borbas et al. |
| 4,087,626 | 5/1978 | Brader ................... 364/900 |
| 4,118,788 | 10/1978 | Roberts ................. 364/900 |
| 4,120,048 | 10/1978 | Fuhrman ............... 364/200 |
| 4,156,929 | 5/1979 | Eichenlaub et al. .. 364/900 |
| 4,195,344 | 3/1980 | Yamazaki .............. 364/200 |
| 4,232,365 | 11/1980 | Englund ................ 364/200 |
| 4,237,536 | 12/1980 | Enelow et al. ........ 364/900 |

FOREIGN PATENT DOCUMENTS 1492626 11/1977 United Kingdom ............... 364/200

OTHER PUBLICATIONS

IBM Technical Disclosure Bulletin, vol. 15, No. 1, Jun. 1972, pp. 81-83, Galpin.

*Primary Examiner*—Joseph F. Ruggiero
*Assistant Examiner*—Jameson Lee
*Attorney, Agent, or Firm*—Mark P. Kahler; Edward M. Roney; James W. Gillman

[57] ABSTRACT

A supervisory control system for interrogating a large number of remote units. A pseudorandom sequence of bits are generated by central control in cycles and received by the remote units. Each remote unit is provided with a pseudorandom bit sequence generator. Upon coincidence of the pseudorandom bit sequence from the central control and the remote unit and upon detection of the address of remote unit and of the specific point in that remote unit, the remote unit sends back to the central control the status information of the selected point during the next succeeding bit time interval. In this manner the statuses of entire set of remote units are interrogated and reported. In accordance with a further aspect of the present control system, the control system commands the remote units for action and the remote units send back command acknowledge signals. This is accomplished by deviating from the pseudorandom bit sequence at the address of the desired point in a certain remote unit, reversing the next bit and repeating the same last n bit sequence for sending a command signal and the addressed remote unit receiving the two identical bit sequences and sending back command acknowledge signals.

9 Claims, 10 Drawing Figures

SUPERVISORY REMOTE CONTROL SYSTEM EMPLOYING PSEUDORANDOM SEQUENCE

FIELD OF INVENTION

This invention relates to a supervisory control system that utilizes a pseudorandom sequence of bits for addressing and interrogating remote units, whereby the statuses of the remote units are checked and controlled in a minimal period of time.

BACKGROUND OF THE INVENTION

In a supervisory control system where a large number of remote units transmit data to a central control, but each remote unit transmits only a small quantity of information, in such a system the length of the interrogation cycle takes longer than the meaningful information sent back by the remote units to the central control.

According to the prior art, in a system with a large number of remote units, the interrogation word is composed of a number of bits which define the address of the remote unit; and if it is wished to add reliability to the system, a number of error detection bits must also be added. In contrast, the number of information bits sent back from the remote is low.

If all the information bits sent back comprise status information such as whether a monitored unit is operating or not operating, which is easily indicated by binary bits zero and one, the conventional method becomes wasteful from the point of view of time because long questions or interrogations from the central control receive only short answers from the remote units, and thus most of the time is taken up by the questions, and not by the transmission of useful information back to central control.

SUMMARY OF THE INVENTION

An object of the present invention is to provide a supervisory control system, whereby the overall supervisory control time is minimized. In particular, it is the object of the present invention to provide a method and apparatus for reducing the amount of time, and thus the amount of the useful communications time taken up by the interrogation signals sent from a central control to a large number of remote units being supervised.

It is yet another object of the present invention to provide secure and accurate command control in a supervisory control system using pseudorandom bit sequence.

In accordance with the present invention, the aforementioned problems and shortcomings of the prior art are overcome, and the aforementioned objects are obtained by a supervisory control system having a large number of remote units, each unit having a predetermined bit address and a central control for supervising the remote units, wherein a cyclic generator in the central control is used to generate a pseudorandom sequence of binary bits and remote units are adapted to receive the pseudorandom sequence of bits from the cyclic generator and send status information of remote units back to the central control.

According to a further aspect of the present invention, the addressing bits for addressing the remote units may be repeated in a unique way to signify a control command, and the remote units are provided with means to not only send back status information but also acknowledge control command.

The foregoing and other aspects of the present invention will be made clearer from the following detailed description of an illustrative embodiment of the present invention in conjunction with the accompanying drawings.

DETAILED DESCRIPTION

Figure 1:
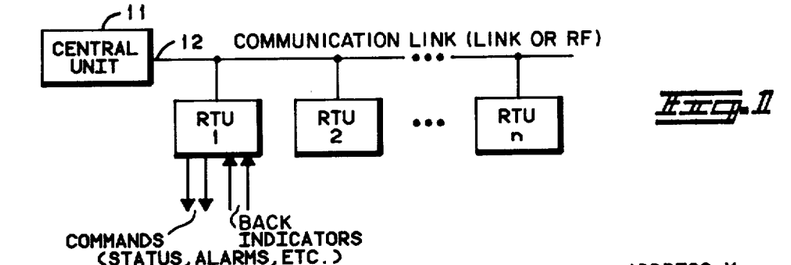
FIG. 1 shows, in a functional block diagram form, a supervisory control system which provides a pseudorandom sequence of bits for interrogating the remote units in accordance with the present invention.
Figure 2:
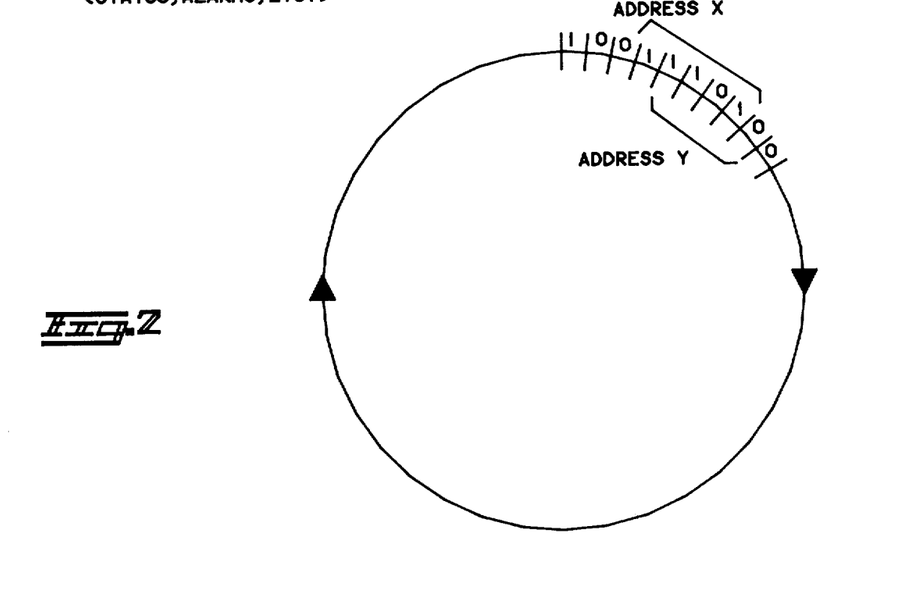
FIG. 2 shows a pseudorandom bit cycle.
Figure 3:
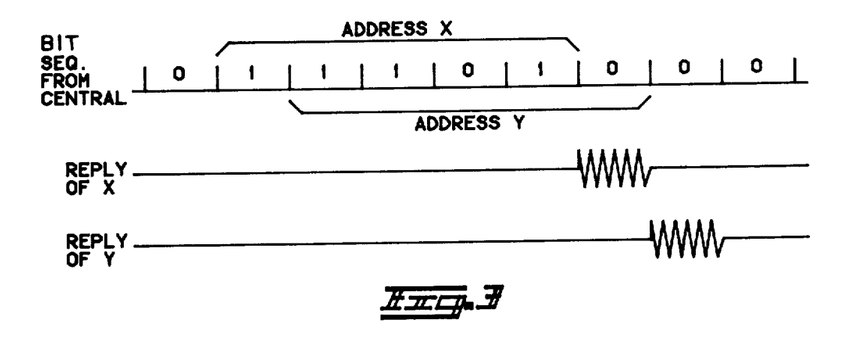
FIG. 3 shows the pseudorandom bit addresses and the replies from the remote units.

Generally referring to FIGS. 1, 2 and 3, where it is necessary to transmit data from a large number of remote units RTU 1, RTU 2 ... RTUn to a central unit 11 and each remote unit transmits only a small quantity of information, the problem of the length of the interrogation cycle arises, i.e., the time it takes the central to interrogate each of the remote units. In systems where high reliability is required, the central addresses each remote separately according to the address defined for the specific unit and only then does the remote reply and send its information.

In systems with large numbers of remote units, the interrogation word is composed of a number of bits which define the address of the remote unit; and if it is wished to add reliability to the system, a number of error detection bits must also be added.

When the number of information bits sent back from the remote is low, the method becomes wasteful from the point of view of time, because long questions from the central receive short answers from the remote units, i.e., most of the time is taken up by the questions and not by the transmission of useful information.

The method described in this disclosure endeavors to solve this problem of occupying the communication channel from the point of view of time by exploiting the special characteristics of the pseudorandom sequence generated by a cyclic generator. The communication channel 12 may be a hard wire line or RF (radio frequency) link of any conventional nature.

INTERROGATION BY A PSEUDORANDOM SEQUENCE OF BITS

In accordance with the present inventive method, each information bit transmitted by any remote unit to the central is assigned a specific address. Thus, in a system with R remote units and K bits reported by each remote, there will be $R \times K$ different addresses.

The central transmits a pseudorandom sequence of bits generated by a cyclic generator of degree n, as illustrated in FIGS. 2 and 3. Such a sequence has a cycle length of $2^n - 1$ bits, and the important characteristic which is exploited here is that if we consider a group of n consecutive bits, we find that during a cycle there are $2^n - 1$ such groups, all different from one another, thus obtaining all the combinations possible for n bits (except one: 000 . . . ). The value of n is chosen in such a way that $2^n - 1 \geq R \times K$.

Figure 4:
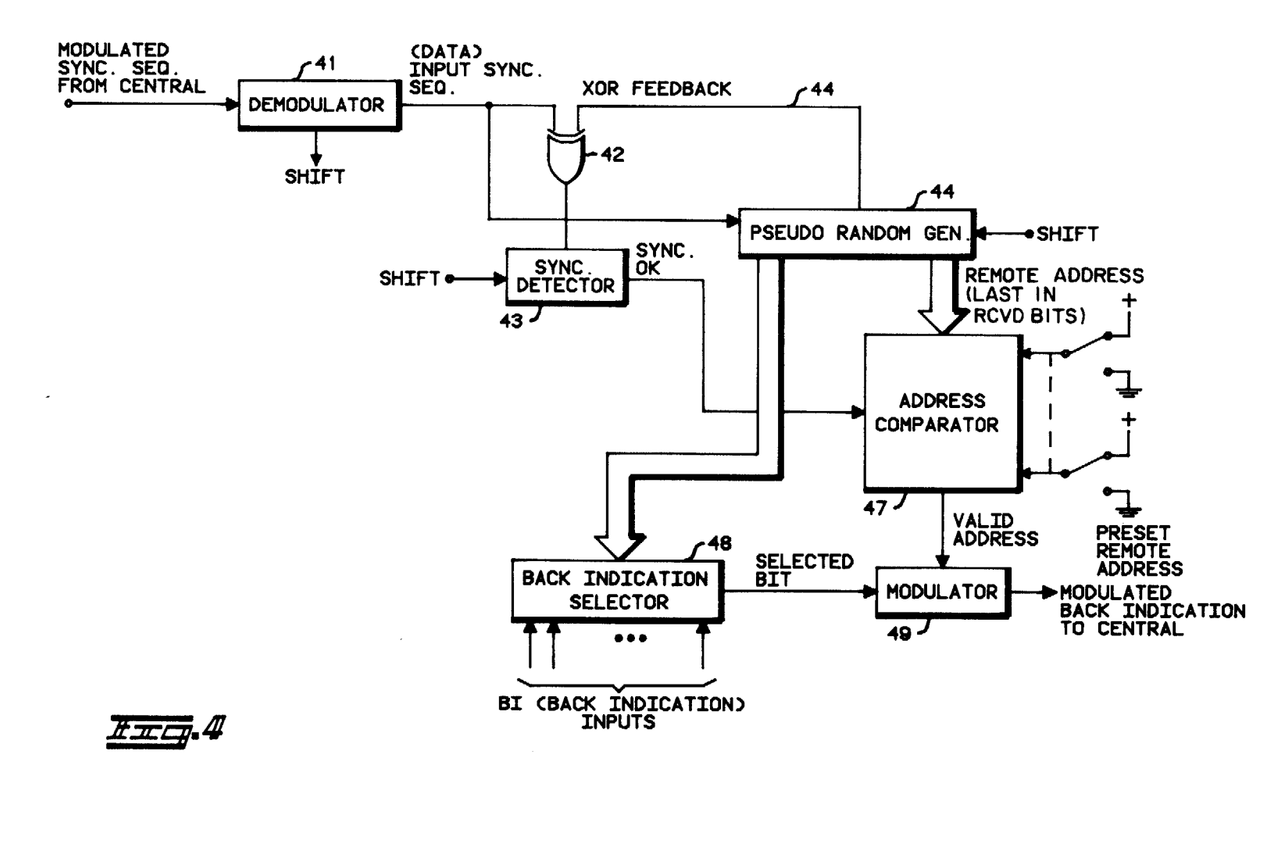
FIG. 4 shows a functional block diagram of a remote unit designed to receive the interrogation signal in the form of a pseudorandom bit sequence and send a status indication back to the central control.

As illustrated in FIG. 4, in each remote station or unit there are a number of points or relay contacts, the statuses of which must be transmitted back to the central. The statuses of the points are selected for transmission by the back-indication or status-indication selector circuit, one after the other, each in its corresponding time slot, defined by the specific point address transmitted by the central. Each remote unit contains one back-indication selector. Status or back-indication are one and the same.

If the remote units check every time the group of n bits received last, a different address is received each time, and in this way each time a specific remote unit identifies itself.

When a remote unit identifies the address of one of its points, it has at its disposal the time it takes the central to transmit the next bit in the sequence for sending back to the central the status of the specific point, as illustrated in FIG. 3. By this method, therefore, a continuous transmission of all the status or back indication information of $R \times K$ bits from the remotes is obtained simultaneously with the synchronizing sequence transmitted from the central, which is the minimal time for receiving all the information at the central.

It will perhaps be more clear if the above is explained by a concrete example.

In case of R=63 remote units or stations, each of the remote units or stations may be interrogated in a unique way, and each remote station reports back to the central the status or back-indication of K=2 conditions, representing the status of the remote unit, the situation will be as follows:

Six bits will define the address of the remote station and one bit, by being either 1 or 0 will define the address of the two back-indications or points. Each contact or point can be either closed or open, and this status is transmitted back to the central by keying a tone or in other suitable ways. This tone is transmitted back to the central control during the next time slot (bit) after the time slot defined by the address of the contact or point. "Point" is a general term and may have two statuses, e.g., when the point is a contact, it may either be open or closed.

There will be two at the power of six ($2^6 = 64$) addresses less the all-zero address. This means 64 − 1 or 63 remote station addresses. In each remote station there will be two statuses or points. This makes a total of $R \times K = 63 \times 2 = 126$ statuses or contact points.

Thus, each point in the remote has its own address composed of the address of the station, plus the address of the point in the station. The next time slot after the point address defines a time slot for sending back to the central station the status of that point.

Note that the illustrations shown in FIGS. 1, 2 and 3 refer to a specific case of 31 remote stations, each of which reports back to the central the status of one point and controls one point only. Thus, the point address is the same as the remote station address and is composed of the same five bits. Should each of the remote stations have reported back to the central the status of four points and controlled four points, the point address would have contained two additional bits besides the five bits which define the remote station address.

The central station transmits continuously a pseudorandom sequence where the addresses of the remote units are overlapping: As illustrated in FIG. 2, bits 1 through 5 define one remote unit, bits 2 through 6 define another remote, bits 3 through 7 define a third remote, and so forth through bit $2^n - 1$. While bit 6 is being transmitted, the remote station (or point) defined by bits 1 through 5 transmits back to the central the appropriate signal, such as a tone, for indicating the status of the monitored point.

RELIABILITY OF THE INTERROGATION VIA A PSEUDORANDOM SEQUENCE

The method described above provides quick gathering of information from the remotes. For this gathering to be executed reliably, errors of identification by the remote units must be prevented, i.e., situations must be prevented where, as a result of noise on the communication channel, an error occurs in the identification of the bits by the remotes causing the remotes to transmit their information back to the central not in their allotted time slot. The error may be prevented by using the fact that the pseudorandom sequence is known, by adding in each remote unit a pseudorandom generator identical to the one in the central and synchronized with the sequence transmitted from the central. In this way, the remote unit knows what bit to expect from the central; and if an incorrect bit appears, it is considered as an indication that the two generators are no longer synchronized or that there is noise on the channel. The remote is considered as synchronized when n consecutive positive comparisons of the sequence received from the central with that generated by the remote are obtained.

The field of the address of a specific point in a specific remote unit may be divided into two parts or fields.

a. the address of the remote unit.

b. the address of the point in the remote unit.

The transmission of information from the remote unit back to the central unit depends, therefore, on two conditions:

a. That the remote unit is synchronized with the sequence transmitted from the central.

b. That the address of that specific remote unit has been detected.

Only if these two conditions are fulfilled does the remote unit transmit the status of the specific point defined in that part of the address field which defines the point.

FIG. 4 illustrates a functional block diagram of the detection and back-indication or status-indication circuits of a remote unit. A given number of bits, such as 5 bits will define the address of the remote stations and one bit by being 1 to 0 will define the address of the two back indication points.

The synchronizing signal, i.e., the pseudorandom bit sequence, arriving from the central by any modulation method is fed into the demodulator circuit which generates the DATA and SHIFT signals. Data is thus an input synchronization sequence bits. The SHIFT signal is used to serve as the clock for the whole remote unit.

Demodulator 41 used here is a conventional circuit which decides whether a bit is one or zero. This information is contained in the signal transmitted from the central station. The signal may be transmitted from the central in a number of transmission methods, such as polarity ($+ = 1$; $- = 0$), pulse-duration modulation ($T = 0$; $2T = 1$), AM keying, frequency-shift keying (FSK), phase-shift keying, etc.

The data obtained after the demodulation is compared with that produced by local pseudorandom generator 44 and serves as an input signal to the sync detector 43. For comparing, any conventional comparator 42 may be used. The comparator compares the output from the modulator 41 to a feedback signal from the pseudorandom generator. After n consecutive positive comparisons, the sync detector drives high the SYNC OK signal. If a negative comparison is obtained, SYNC OK goes low and remains low until n consecutive positive comparisons are again obtained. For the pseudorandom generator 44 a conventional shift register of a design that can contain, when the system is synchronized, the n bits received from the central unit 11 which are equal to the bits produced by the generator 44 itself is used and therefore n parallel outputs of the generator serve as a parallel address with two parts:

a. the address of the remote unit b. the address of the specific point in the remote unit.

The remote address is compared by the address comparator 47 with the remote's preset address and if the comparison is positive and on condition that SYNC OK = 1, the VALID ADDRESS signal is generated.

The address of the specific point is coupled to the back indication or status indication selector 48 which transfers the selected back indication signal, BI, to the modulator 49.

The modulator 49, upon receiving the VALID ADDRESS signal, generates a MARK or a SPACE signal, according to the selected back indication signal. This signal is sent to the central as modulated back indication signal.

Only if these two conditions, that is, conditions for the valid address and back indication signal, are fulfilled does the remote unit transmit the status of the specific point defined in that part of the address field which defines the point.

SYNCHRONIZATION OF THE GENERATOR IN THE REMOTE

An accepted method for synchronizing a pseudorandom generator 44 is to open its feedback path 45, feed into its n correct bits and then close again the feedback path. From this point on the generator is synchronized until synchronization is lost due to noise, when it must be synchronized again.

Figure 5:
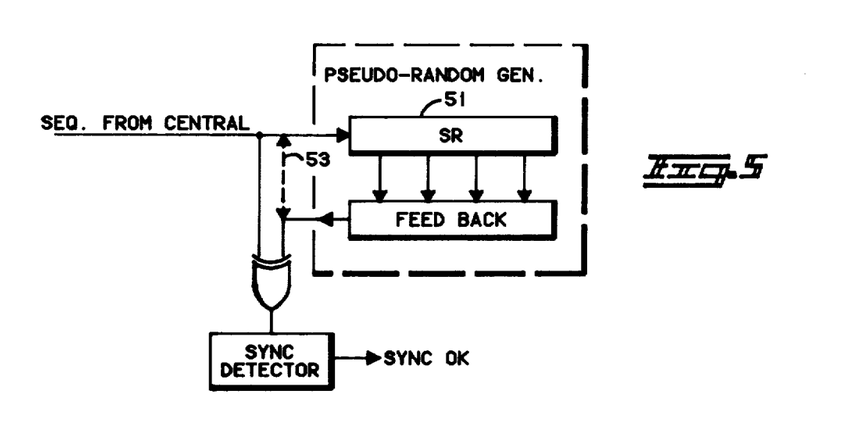
FIG. 5 shows an illustrative circuitry for synchronizing the remote unit with the central control.

In FIG. 4, a more simple synchronization method, requiring fewer components, is described. The principle of the circuit is presented in FIG. 5.

The circuit is based on the fact that when the generator is synchronized, the sequence appearing at the input of the shift register 51 (the feedback output) is identical to the sequence received from the central and therefore there is a kind of virtual short at the place 53 marked with a dotted line. In addition, when synchronization is lost, the feedback must be opened and the sequence received from the central applied to the input of the shift register. Therefore, in the circuit shown in FIG. 5, the feedback is open and serves only the comparator circuit in producing the SYNC OK signal, while the sequence arriving from the central is continuously applied to the shift register input. In this way, the stage of switching the shift register input is eliminated.

USE OF THE PSEUDORANDOM SEQUENCE FOR CONTROL COMMANDS

Up to now, a system using the pseudorandom sequence for interrogation was described. When it is necessary to send from the central to the remotes control commands as well, the method requires additional steps.

One possibility is to transmit control command signals in addition to the sychronizing sequence during the time that the remote is identifying itself while the VALID ADDRESS signal is produced in the remote. Note, however, that there is, of course, no necessary connection between a back-indication (or status-indication) and a control command having the same address.

In the following, a highly reliable method for sending control commands while the interrogation is conducted while using the same pseudorandom generator is described. The method enables sending to a remote unit the same number of control commands as the number of back-indications (or status-indications) defined in it, although, of course, the control command and the back-indication using the same point address are not necessarily related (i.e., the status inputs and the control outputs of the remote must not necessarily be connected to the same external device).

Figure 6:
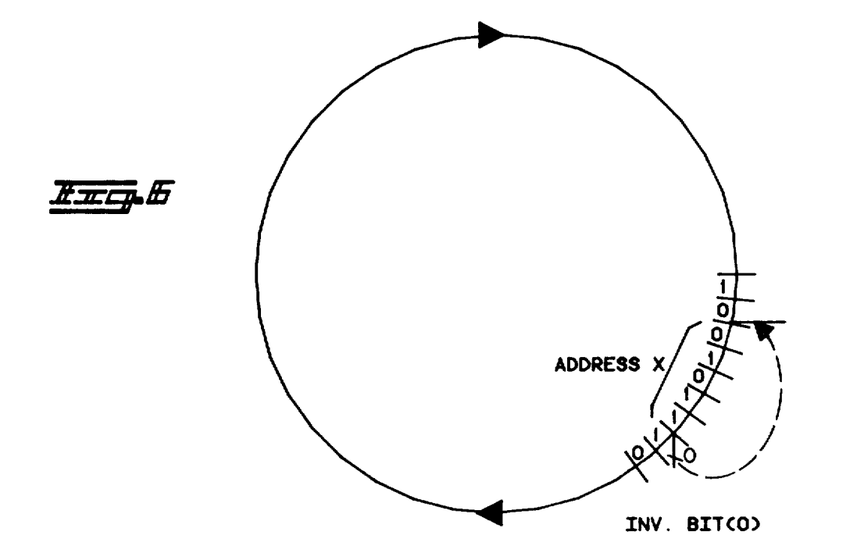
FIG. 6 shows how a series of bits representing an address of the pseudorandom bit sequence may be repeated and transmitted by the central control.

FIG. 6 presents the large loop describing the synchronizing sequence cycle. When it is wished to send a control command to address X, the sequence is sent as usual up to the bit right after address X. This is the time when the remote sends back to the central the status of point X. Then, instead of continuing as usual, the central control deviates from the normal sequence by transmitting the inverse of the bit expected by the remote. After this inverted bit, the address of the point, i.e., the n bits defining address X, is repeated and from then on the usual interrogation sequence is continued.

Figure 7:
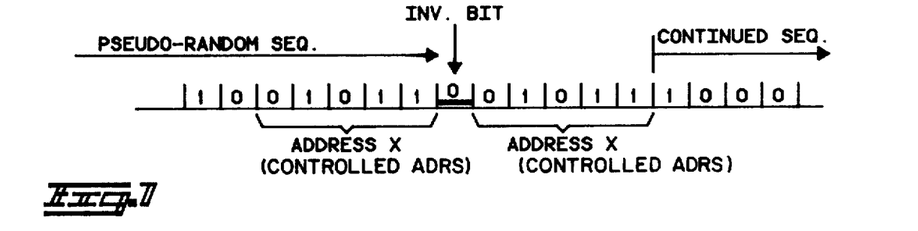
FIG. 7 shows the repetition of the pseudorandom bit sequence spaced by an inverted bit between the two repeating pseudorandom bit sequences.

As illustrated in FIG. 7, the control command consists of a continuous pseudorandom sequence interrupted by an inverted bit and a repetition of the remote address transmitted last which is the address where the command is executed, and then a continuation of the sequence as if it had never been interrupted.

The advantage of the method is the reliability of the repetition of an address that has already appeared as part of the pseudorandom sequence while both at the central and at the remote the only addition is the use, during the control period, of the feedback taken from the $n+1$ flip-flop of the shift register which is part of the pseudorandom generator, instead of the feedback from the exclusive OR gates. Note that since the generator contains only n flip-flop stages, an additional flip-flop and a switching system for the feedback must be provided.

At the remote unit, on condition that it had been in synchronization as indicated by SNYN OK, the inverted bit causes the sychronization to be lost. When the synchronization is lost SYNC OK goes low. But instead of attempting to recapture synchronization, the remote transfers to the additional feedback network and checks whether the central repeats the address transmitted last, before the inverted bit, i.e., whether a control command is transmitted. If n consecutive positive comparisons are obtained, it means indeed a control command which is executed immediately by that remote which has also detected a valid address, although all of the remotes had transferred to the command cycle. If for even one of the bits no positive comparison is obtained, the remote goes out of the command cycle and attempts to recapture synchronization.

INTERROGATABLE AND CONTROLLABLE REMOTE

Figure 8:
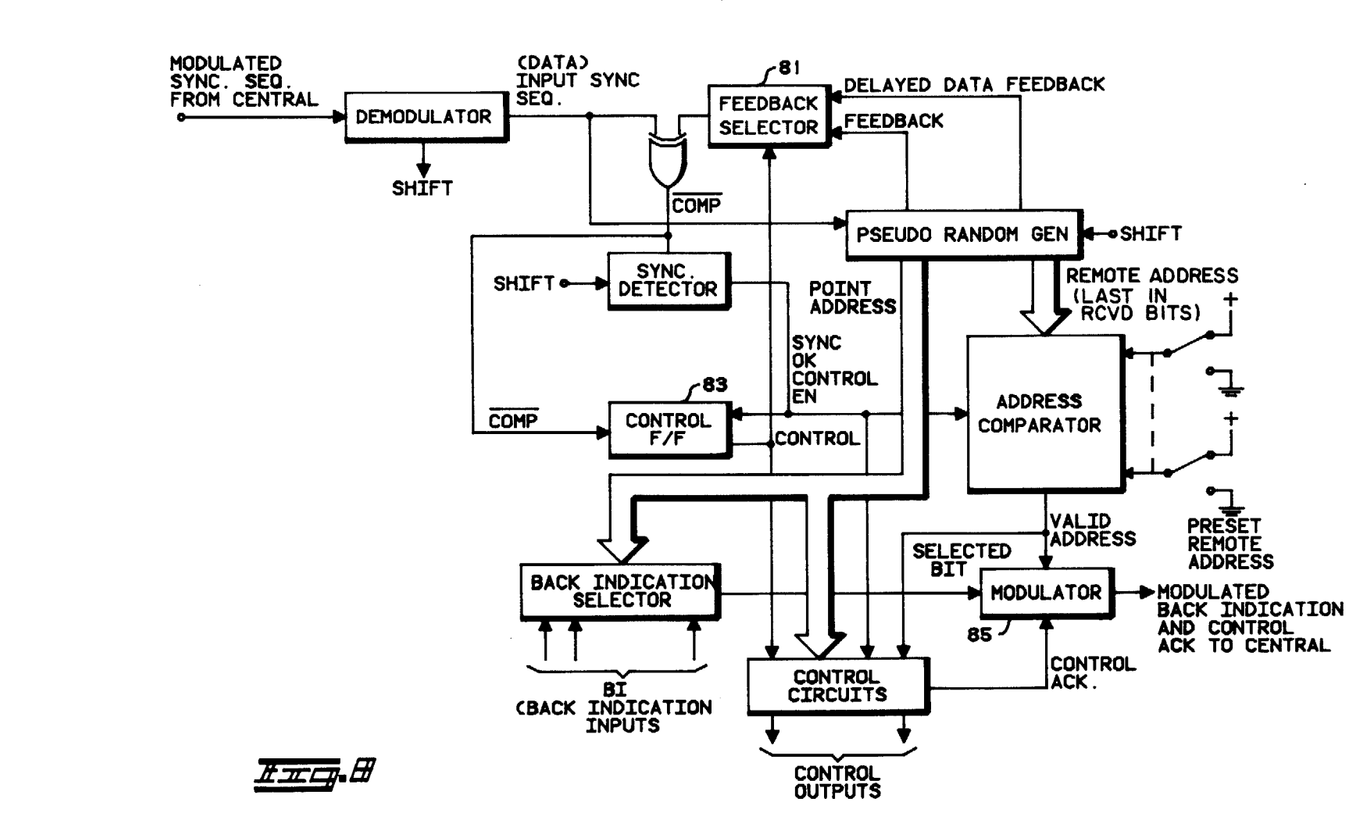
FIG. 8 shows a functional block diagram of a remote unit adapted to detect the first pseudorandom bit sequence and then detect the same pseudorandom bit sequence repeated in succession to answer status interrogation signal and acknowledge and execute a control command signal from the central control.

FIG. 8 illustrates a remote unit in a functional block diagram designed to answer to interrogation sequences and execute control commands. The difference as compared to FIG. 4, is the addition of a feedback selector 81 controlled by the CONTROL signal from a CONTROL flip-flop (F/F) 83. When the CONTROL signal from CONTROL F/F 83 goes high, the n+1 stage feedback of the pseudorandom generator is selected.

The synchronization, SYNC OK, signal used to signify presence of synchronization to pseudorandom generator has a double function. Hence SYNC OK signal is also used as the CONTROL ENABLE (CONTROL EN) signal from CONTROL FF 83.

When a deviation from the pseudorandom sequence to the control sequence is executed, the CONTROL signal goes high and SYNC OK (CONTROL EN) goes low. But if n consecutive positive comparisons are obtained (in the control cycle) SYNC OK (CONTROL EN) will go high and if at that time VALID ADDRESS also goes high, the three conditions for actuating the control circuits are fulfilled. The control command executed is, of course, a function of the point address.

The control acknowledgment function actuates the modulator for transmitting back to the central a MARK tone as the CONTROL ACKNOWLEDGMENT (CONTROL ACK) signal (appears simultaneously with the VALID ADDRESS signal of the control command) to inform the central that the control command has been received by the remote.

Figure 9A:
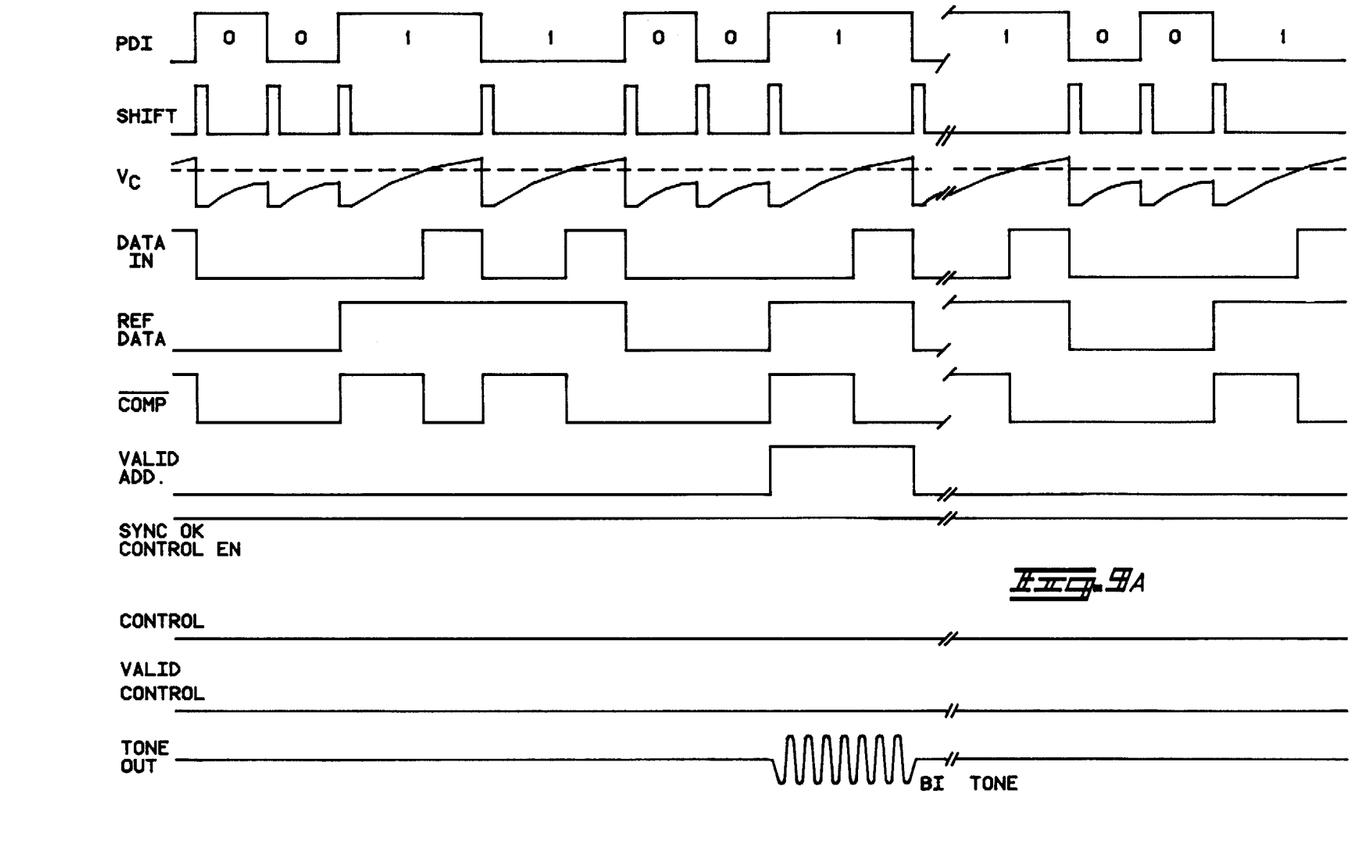
FIGS. 9A and 9B illustrate the waveforms at the various parts of the remote unit illustrated in FIG. 8.
Figure 9B:
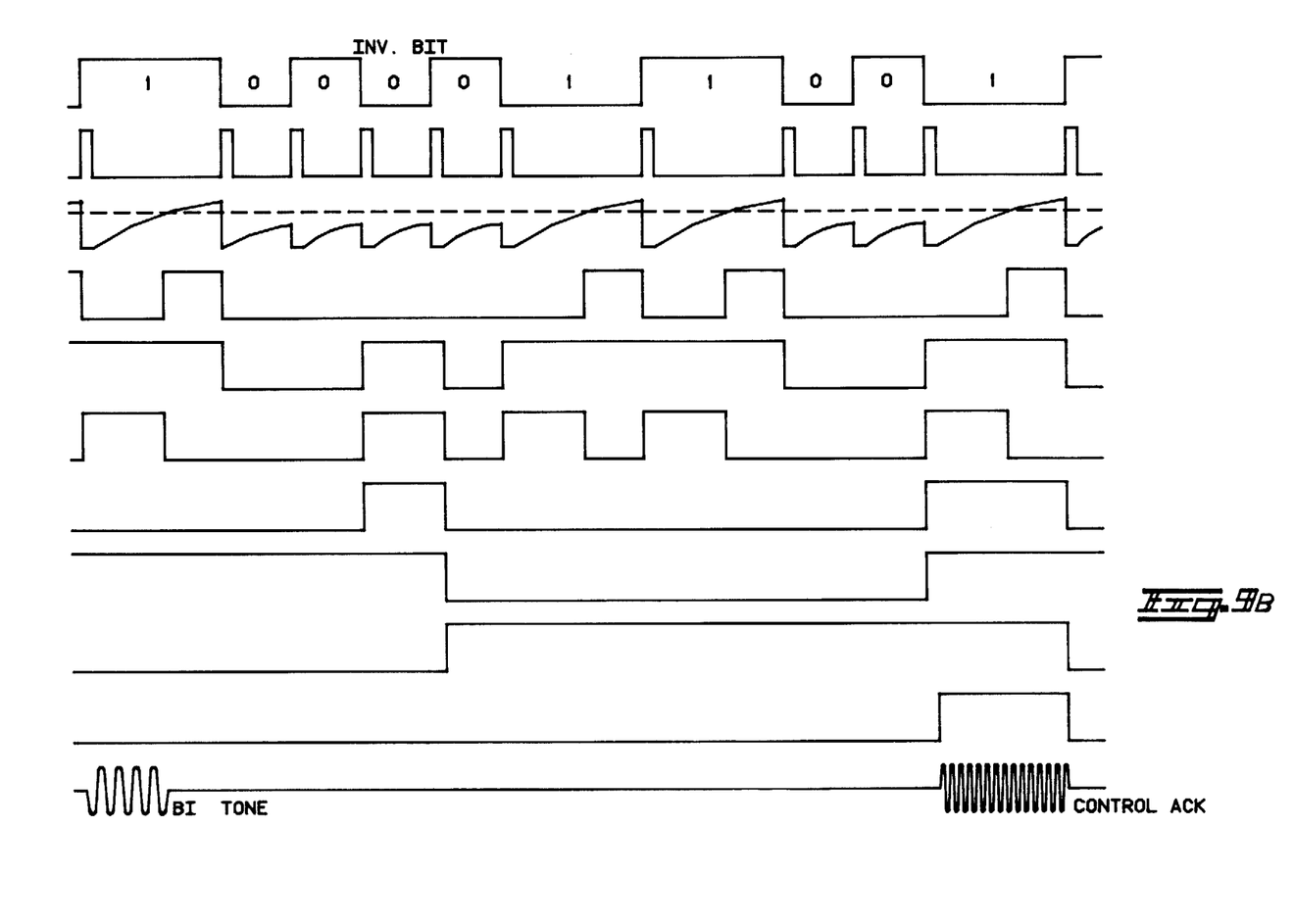

FIGS. 9A and 9B, when placed next to each other, illustrate the waveforms at various points of the remote unit appearing in FIG. 8. The waveforms in FIGS. 9A and 9B refer to a specific case where the synchronizing sequence from the central is transmitted in pulse-duration modulation i.e., a logic 1 is represented by a pulse twice as wide as for a logic 0 while the remote's answer is one of two tones (one tone for MARK=closed contact at the STATUS INDICATION input and the other for SPACE=open contact). It is, of course, possible to select any other modulation method, as desired. In the specific case presented here, n=5.

Restated, in summary, where control command has to be given in a remote unit, the pseudorandom sequence is interrupted by inverting the bit following the address of a certain point in a certain remote station and then repeating that specific address. For example, after transmitting bits 1 through 5, bit 6 is transmitted inverted and then bits 1 through 5 are repeated. The sequence is then continued as if it had never been interrupted, and while bit 6 is being transmitted by the central, this time correctly, i.e., not inverted, for interrogating the next remote, the previous remote (i.e., the remote defined by bits 1 through 5) transmits back to the central a "control acknowledged" signal. Thus, after a control command, the time slot is not used for transmitting back a status, but for acknowledging the control command.

The status points and the control points of the remote unit may be connected to the same device or to different devices, although the addresses of the status points and the control points in one remote will always be the same i.e., control point 1 and status point 1 share the same address. In practical terms, the status point may monitor a wind meter while the control point with the same address may actuate a pump, or the status point may monitor the same pump actuated by the control point.

A advantage of the present method is that the synchronizing sequence which serves for interrogation also ensures that the remote is indeed synchronized before the sequence is interrupted for the control command. The fact that the control command contains the same bits which already appeared in the synchronizing sequence and were checked by the remote, enhances the reliability of the system.

From the point of view of implementation, the method is simple and requires only the closure of one more feedback of n+1 degree of the shift register for control command.

Various modifications and changes may be made to the present invention by those skilled in the art without departing from the spirit and scope of the invention defined in the accompanying claims.

I claim:
1. A supervisory remote control system comprising:
   a plurality of remote units each having a predetermined number of status points, each status point having a respective status point address, said remote units being selectively responsive to reception of respective status point addresses, for transmitting status information pertaining to an addressed status point, respectively;
   a central control means, coupled to said plurality of remote units via respective communication paths, for addressing the status point addresses of said remote units and for receiving transmitted status information from said remote units;
   said control means including status point address generating means for generating and transmitting to said remote units a cyclically continuous bit sequence, one bit at a time, having a plurality of successive cycles wherein each cycle exhibits an identical cyclic bit sequence having a cycle length of $2^n - 1$ bits as does any other cycle, wherein n is the number of bits in each of said status point addresses, said cyclic bit sequence in each of said cycles being arranged such that $2^n - 1$ distinct status point addresses, each comprised of n contiguous bits, are contained therein;
   each of said remote units including detecting means for detecting, after each successive bit in each cycle, whether a just received bit completes a respective status point address with $n-1$ contiguous bits immediately preceding said just received bit in said cyclically continuous bit sequence having a plurality of cycles, such that collectively said just received bit and said $n-1$ preceding bits comprise n contiguous bits constituting a status point address in said cyclically continuous bit sequence having a plurality of cycles,
   each of said remote units including response means, coupled to said detecting means, responsive to each detection by said detecting means of the comple- tion of a respective status point address for transmitting indicia of the status of a status point, the address of which is detected as being completed by said just received bit, back to said control means during the next bit immediately following said just received bit, respectively.

2. The supervisory remote control system of claim 1 wherein each of said remote units includes bit sequence generating means for generating substantially the same cyclically continuous bit sequence as generated by said status point address generating means.

3. The supervisory remote control system of claim 2 wherein each remote unit includes synchronizing means, coupled to the bit sequence generating means thereof, for synchronizing the cyclically continuous bit sequence generated by said bit sequence generating means with the cyclically continuous bit sequence generated by said status point address generating means.

4. The supervisory remote control system of claim 1 wherein said cyclically continuous bit sequence is pseudorandom.

5. A supervisory remote control system comprising:
a plurality of remote units having a predetermined number of status points, each status point having a respective status point address, said remote units being selectively responsive to reception of respective status point addresses, for transmitting status information pertaining to an addressed status point, respectively;
a central control means, coupled to said plurality of remote units via respective communication paths, for addressing the status point addresses of said remote units, and for receiving transmitted status information from said remote units;
said control means including status point address generating means for generating and transmitting to said remote units a cyclically continuous bit sequence, one bit at a time, having a plurality of successive cycles wherein each cycle exhibits an identical cyclic bit sequence having a cycle length of $2^n-1$ bits as does any other cycle, wherein n is the number of bits in each of said status point addresses, said cyclic bit sequence in each of said cycles being arranged such that $2^n-1$ distinct status point addresses, each comprised of n contiguous bits, are contained therein;
said central control means including command signal generating means for generating a command signal to instruct a selected remote unit to perform a function, the command signal comprising the address of said selected remote unit as generated by said status point address generating means, followed immediately by the inverse of the next bit in said cyclically continuous bit sequence having a plurality of cycles, followed immediately by a repetition of the selected address of said selected remote unit; said status point address generating means, after generating a command signal, returning to generating and transmitting said cyclically continuous bit sequence having a plurality of cycles;

said remote units each including first detecting means for detecting, after each successive bit in each cycle, whether a just received bit completes a respective status point address with $n-1$ contiguous bits immediately preceding said just received bit in said cyclically continuous bit sequence having a plurality of cycles, such that collectively said just received bit and said $n-1$ preceding bits comprise n contiguous bits constituting a status point address in said cyclically continuous bit sequence having a plurality of cycles.

6. The supervisory remote control system of claim 5 wherein said remote units include response means, coupled to said first detecting means, responsive to each detection by said first detecting means of the completion of a respective status point address for transmitting indicia of the status of a status point, the address of which is detected as being completed by said just received bit, back to said control means during the next bit of said cyclically continuous bit sequence immediately following said just received bit, respectively.

7. The supervisory remote control system of claim 5 wherein said remote units each include second detecting means for detecting when a command signal for a selected remote unit is received by such remote unit.

8. The supervisory remote control system of claim 7 wherein said remote units include acknowledging means for transmitting an acknowledge-back signal to said control means during the next bit in said cyclically continuous bit sequence immediately following the reception of said respective command signal.

9. The supervisory remote control system of claim 5 wherein said cyclically continuous bit sequence is pseudorandom.

* * * * *